Patented Mar. 27, 1923.

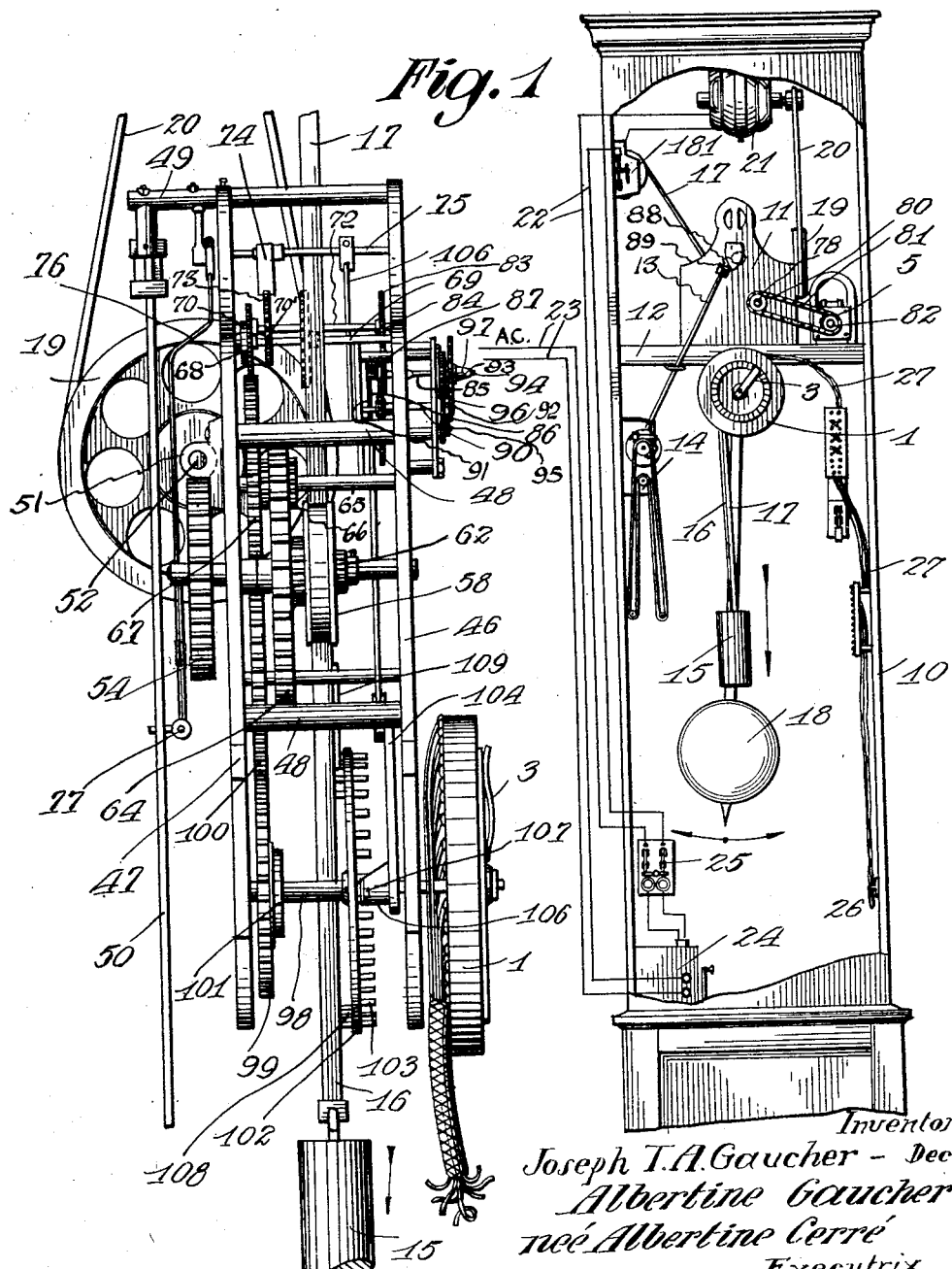

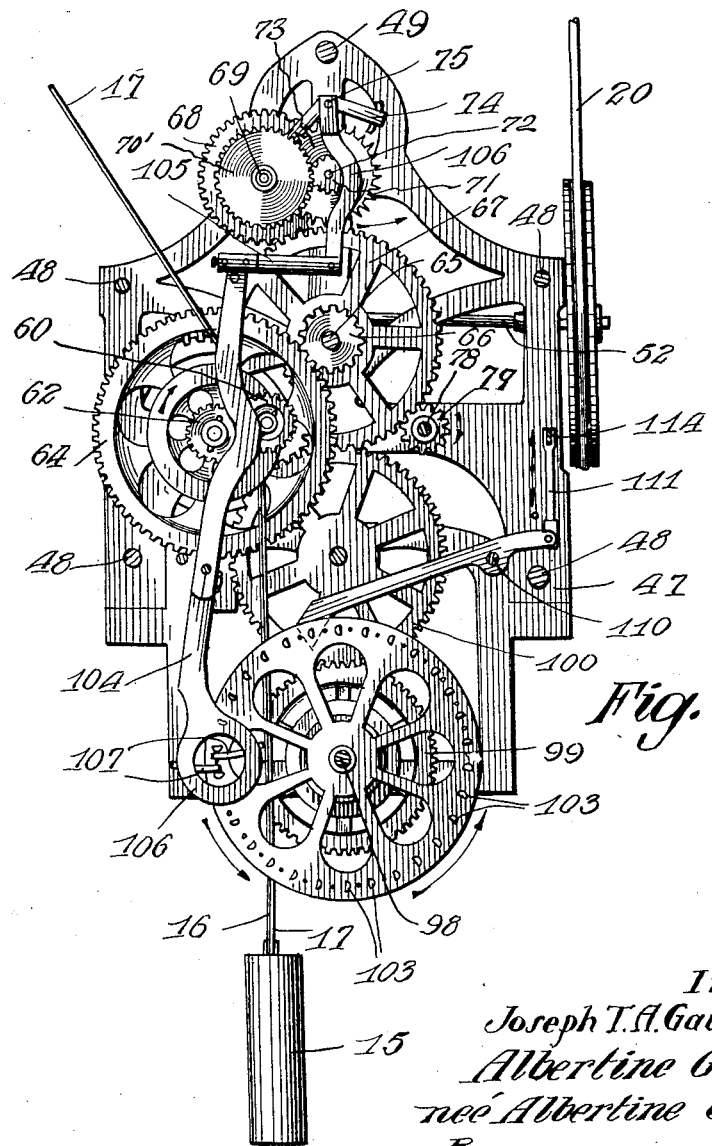

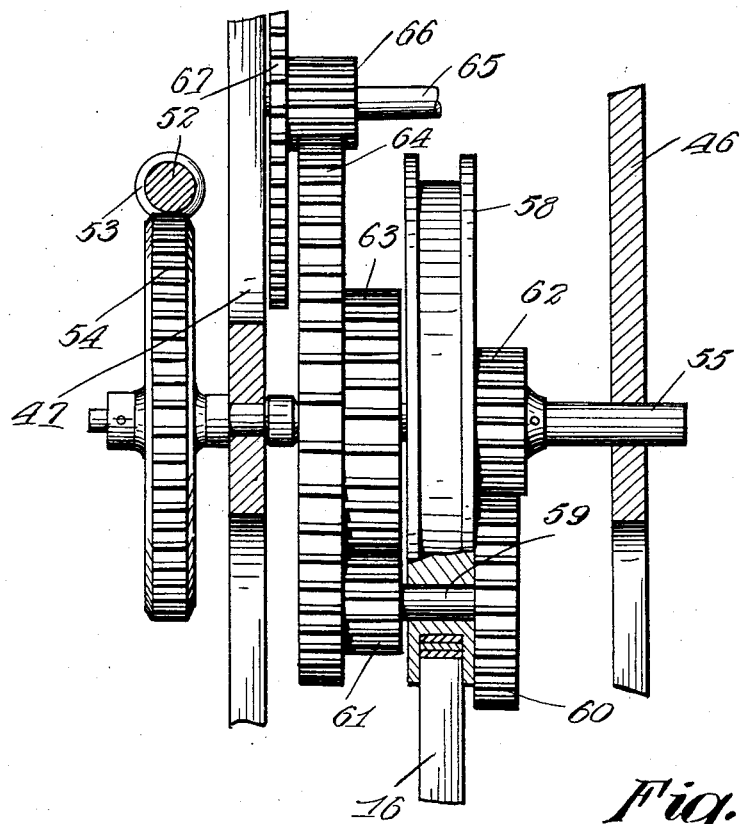
Fig. 4
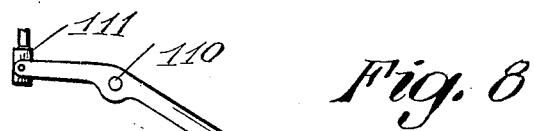
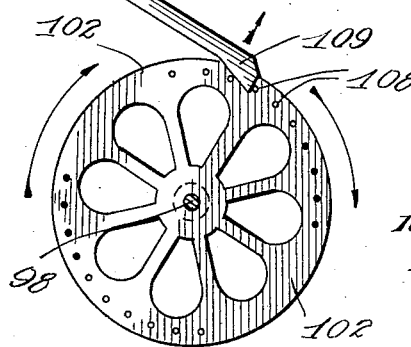
Fig. 8
Inventor
Joseph T. A. Gaucher - Decd.
Albertine Gaucher
née Albertine Cerré
Executrix.
By
William Clinton
Attorney

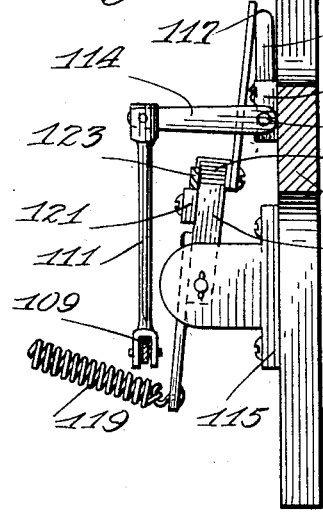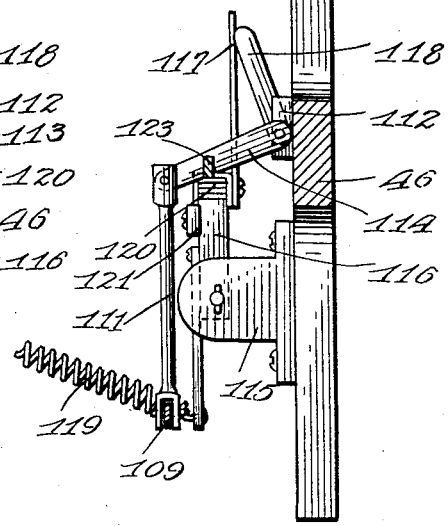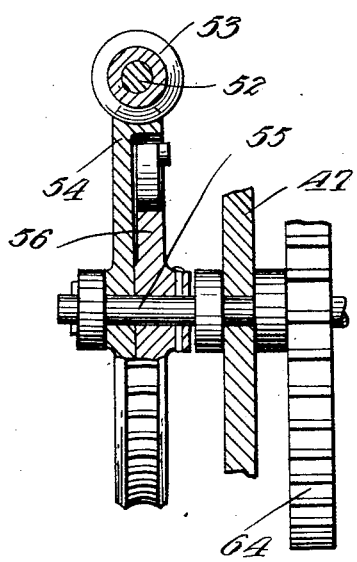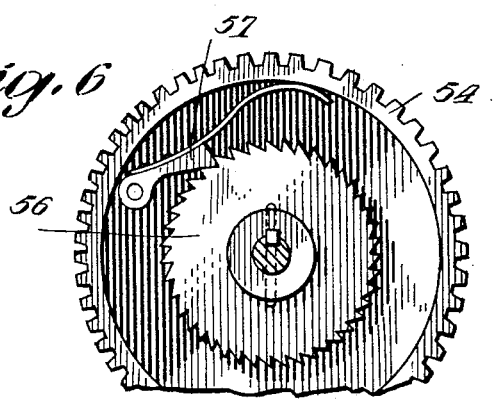

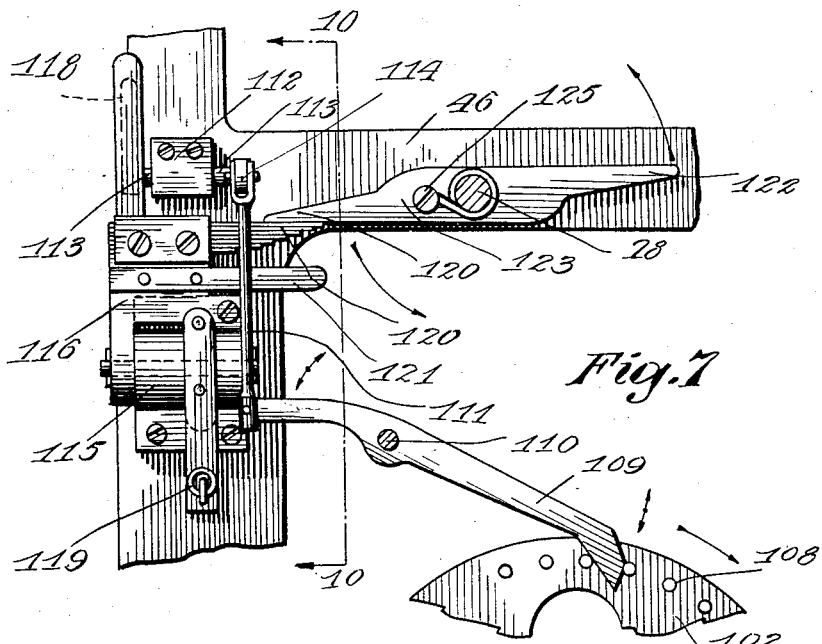
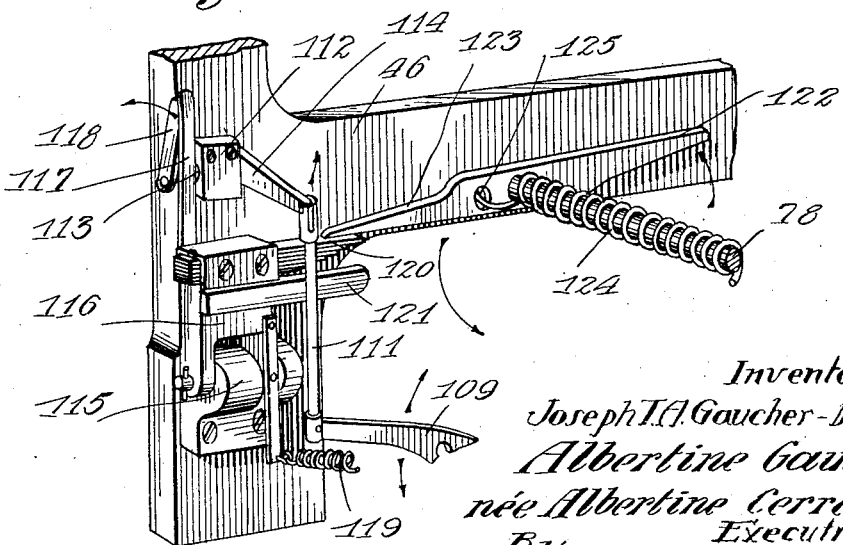

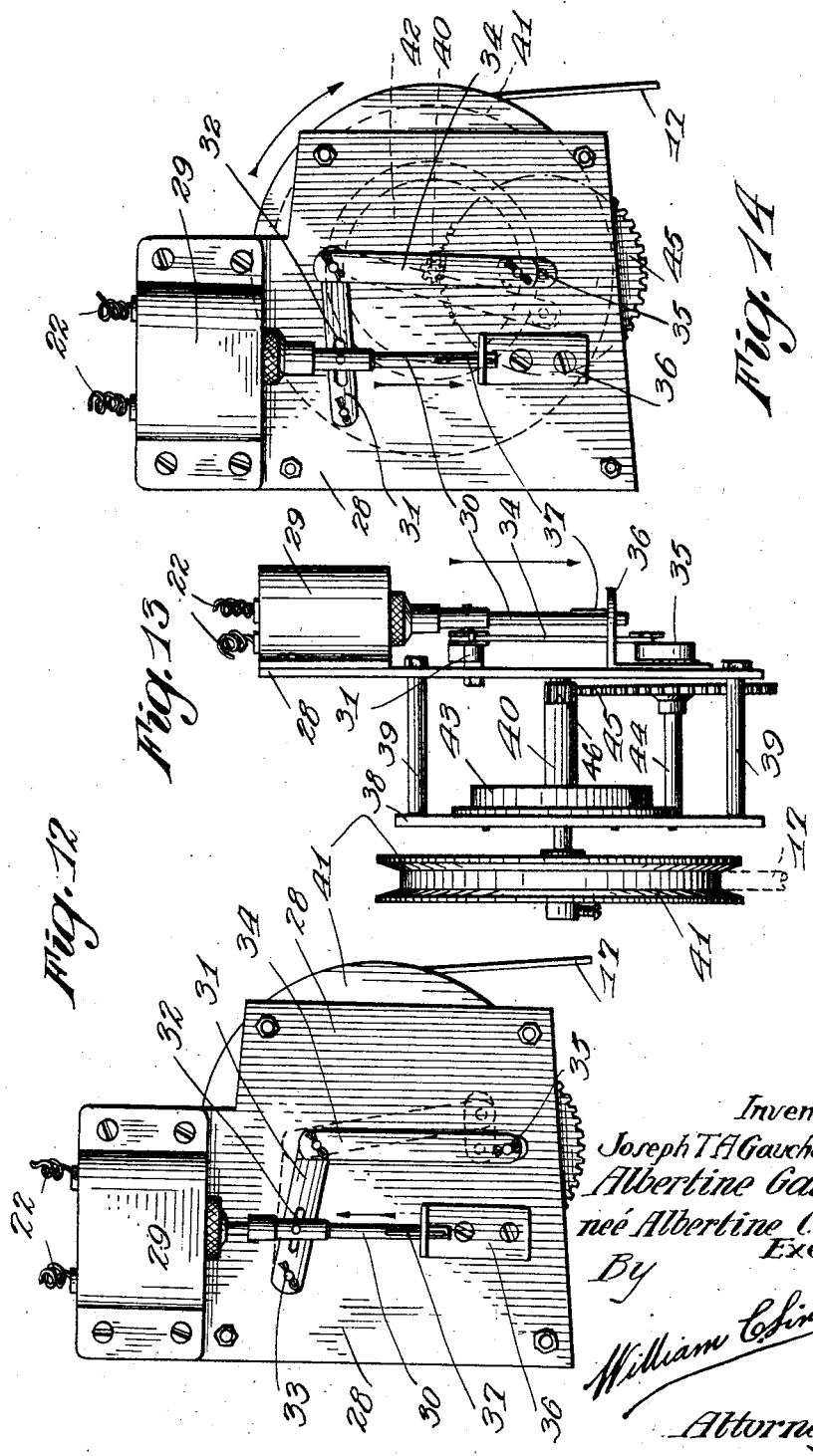

1,449,982

UNITED STATES PATENT OFFICE.

JOSEPH T. A. GAUCHER, DECEASED, LATE OF MONTREAL, QUEBEC, CANADA, BY ALBERTINE GAUCHER, NÉE CERRÉ, EXECUTRIX, OF MONTREAL, QUEBEC, CANADA.

SELF-WINDING CLOCK.

Original application filed June 26, 1920, Serial No. 392,026. Divided and this application filed May 14, 1921. Serial No. 469,681.

*To all whom it may concern:*

Be it known that JOSEPH T. A. GAUCHER, deceased, formerly a subject of the King of Great Britain, and resident of Montreal, Province of Quebec, Canada, did invent certain new and useful Improvements in Self-Winding Clocks; and I, ALBERTINE GAUCHER, née CERRÉ, executrix, do hereby declare that the following is a full, clear, and exact description of the invention, such as will enable others skilled in the art to which it appertains to make and use the same.

The present invention relates to new and useful improvements in clocks and has reference to a division of my former application for patent on electric clocks, filed June 26th, 1920, Serial No. 392,026.

The primary object of the invention is the provision of a clock which will be self-winding at predetermined times and during such winding will provide for the continuous operation of the clock in the usual manner.

Another object of the invention is the provision of a weight actuated clock and means for raising the weight for continuously operating the clock after the said weight has reached its lowermost position without interfering with the continuation of the clock mechanism in the usual manner.

Still another object of the invention is the provision of a clock including an operating mechanism and a weight for actuating the latter together with a suitable motor for rewinding the clock prior to the weight reaching its lowermost position.

A further object of the invention is the provision of a self-winding clock such as above referred to, which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed and illustrated in the accompanying drawings forming a part of the present application, and in which:

Figure 1 is a diagrammatical view of the clock showing the position of the relative parts in the casing;

Figure 2 is a side elevation of the clock mechanism employed;

Figure 3 is a vertical longitudinal sectional view through the same;

Figure 4 is a detail sectional view illustrating the planetary gearing employed between the clock mechanism and rewinding means;

Figure 5 is an enlarged detail section taken through the same;

Figure 6 is a detail elevation of one of the ratchet wheels taken at right angles to Figure 5;

Figure 7 is a front elevation of the escapement mechanism;

Figure 8 is an enlarged detail view of one of the escapement wheels;

Figure 9 is an enlarged detail perspective view of the escapement mechanism;

Figure 10 is a detail sectional view taken on the line 10—10 of Figure 7;

Figure 11 is a similar view showing another position of the escapement mechanism;

Figure 12 is an enlarged detail view showing the switch in one position;

Figure 13 is a similar view taken at right angles to Figure 12; and,

Figure 14 is a view similar to Figure 12, showing the switch in its other position.

Referring now to the accompanying drawings by corresponding characters of reference throughout the several views, the numeral 10 designates in general my improved clock. The clock mechanism is supported within a suitable casing 11 mounted upon a support 12 and this clock mechanism has operatively connected thereto a shaft 13 which latter is employed for driving a time striking mechanism such as chimes or the like; or it may be employed for driving the dials of calenders or the like and which mechanism is indicated by the numeral 14 but forms no part of the present invention. The clock mechanism is driven by a weight 15 which is suspended by means of a strap or band 16, and also connected to this weight 15 is a similar band or strap 17 employed for operating an electric switch 18′. A pendulum 18 also controls the movement of the clock mechanism 11. The clock mechanism has operatively connected thereto a pulley 19 over which passes a belt 20 and the latter passes over a pulley carried by an electric motor 21. This motor has leading thereto the wires 22 and has also in circuit therewith the switch 18′. A suitable source of electrical energy is supplied through the wires 23 to a transformer 24 supported within the casing 10 and the current passes from this transformer through a switch 25 to the wires 22. As the weight 15 of the clock mechanism descends, it will cause the clock mechanism to be set in operation in the usual manner, but when this weight has descended within the casing 10 approximately to a point indicated by the numeral 26, the strap 17 will close the switch 18' whereby current will be supplied to the motor 21. When this motor 21 is set in motion, the weight 15 will be drawn upwardly until it has been completely rewound, at which time the switch 18' is open thereby breaking the circuit in which the motor 21 is included. However, during the rewinding period of the clock mechanism, the master clock as well as the secondary clocks continue on with their operations, so that no time is lost, and in fact the rewinding movement of the master clock in no way affects the time controlling mechanism of any of the clocks. It will also be noted that if a variable output of current is supplied to the motor 21 and which in turn would cause an irregular rewinding of the clock mechanism, the time controlling mechanism of the clock would be in no way affected. When the weight 15 descends to approximately the point indicated by the numeral 26, the switch 18' will be closed, but should, for some unforeseen reason, sufficient current not be supplied to the motor 21 when switch 18' is closed, the weight 15 could continue with its downward travel beyond the line 26 so as to keep the clock in motion for a reasonable length of time, or until the proper amount of current could be supplied to the motor 21, or other means employed for raising the weight 15 so that the continual movement of the clock mechanism would not be interfered with. The wires indicated by the numeral 27 extend from the dial 1 to one or more secondary clocks (not shown).

The switch 18' is shown in detail in Figures 12 to 14 inclusive. Supported within the casing 10 is a plate 28 having secured to one face thereof a casing 29 in which is arranged the switch 18'. This switch is provided with a vertical movable stem 30, and the latter is connected to a link 31 by means of a slot and pin connection, 32, as shown, and this link 31 is pivotally supported upon the plate 28 as at 33. A link 34 is also connected to the link 31 and the lower end of this link 34 is connected to a link 35. Projecting from the plate 28 is a bracket 36 and the lower end of the stem 30 travels through an opening within this bracket. This stem is also provided with a projection 37 which prevents the stem from rotating. Secured to the plate 28 is a plate 38 and this plate 38 is supported in spaced relation with the plate 28 by means of the bars 39. A driven shaft 40 is journalled within these plates 28 and 38 and has keyed to one end thereof a pulley 41 upon which is wound the strap 17. A coil spring 42 is arranged within the casing 43 secured to the plate 38 and this coil spring 42 has one end connected to the casing 43 and its opposite end connected to the shaft 40, so that upon the unwinding movement of the shaft 40 which is caused by the weight 15 descending, the tension of the spring 43 will be increased for storing up power, so that when the clock mechanism is rewound or the weight 15 drawn upwardly, this spring will rotate the shaft 40 so that the band 17 will be wound upon the pulley 41. Also journalled within the plates 28 and 38 is a shaft 44 which has keyed to one end thereof the crank 35 and has also connected thereto a gear 45 which meshes with a pinion 46 carried by the shaft 40. Upon the downward travel of the weight 15, the shaft 40 as well as the pulley 41 will travel in the direction of the arrow, as shown in Figure 14, whereby the shaft 44 will be rotated in the direction of the arrow, as is also shown in Figure 14, so that the crank 35 will exert a downward pull upon the stem 30. When the weight 15 has reached the point 26, the crank 35 will assume the position as is illustrated in Figure 12, whereby the stem will be pulled to its lowermost position and the switch 18' closed. When this switch 18' is closed, the motor 21 is set in motion for rewinding or drawing upwardly the weight 15. As the pull upon the shaft 40 is released, the spring 42 during this rewinding period will cause the shaft 40 to revolve in an opposite direction whereby the released strap 17 will be wound upon the pulley 41 and the crank 35 caused to revolve in the direction of the arrow, as shown in Figure 12. This crank 35, through the mechanism formerly described, will exert an upward push upon the stem 30, and when the weight 15 has assumed its uppermost position, this stem 30 will open the switch 18' whereby the current to the motor 21 will be cut off and the weight 15 will be allowed to descend.

The clock mechanism is supported upon a suitable framework which latter is mounted upon the platform 12 supported within the casing 10 and this framework consists of a front plate 46 and a rear plate 47 which are connected and braced in spaced relation by means of the cross bars 48. Connected to the projecting end of the uppermost cross bar 49 is a depending arm 50 which carries at its lower end the pendulum 18. Journalled within the bearings 51 is a transversely extending shaft 52 having keyed thereto the pulley 19 and this shaft 52 is provided with a worm gear 53 which is adapted to mesh with a gear 54. Journalled within the plates 46 and 47 is a shaft 55 and the gear 54 is loosely mounted upon this shaft 55. A ratchet wheel 56 is keyed to this shaft 55 and the gear 54 is provided with a spring connected pawl 57 which engages the ratchet wheel 56 so as to permit the shaft 55 to move in one direction, but should the gear 54 move in an opposite direction the shaft 55 will be caused to travel therewith. Also loosely mounted upon this shaft 55 is a pulley 58 upon which is adapted to be wound the strap 16. This pulley 58 has journalled therein a shaft 59 and the latter has keyed thereto the pinions 60 and 61. These pinions 60 and 61 are adapted to mesh with similar gears 62 and 63 respectively. The gear 62 is keyed to the shaft 55, whereas the gear 63 is loosely mounted upon the shaft 55 and has formed therewith a large gear 64. From this planetary arrangement of gears, it is obvious that when the shaft 52 is revolved by the motor 21, the shaft 55 may be rotated in one direction for winding the band 16 upon the pulley 58, and when this band 16 has been fully wound upon the pulley, the weight 15 will cause the pulley to revolve in an opposite direction, whereby power will be transmitted to the larger gear 64. It will also be further noted that during the rewinding period, power will still be transmitted to this gear 64 whereby the clock mechanism will be continuously kept in motion.

Also journalled within the supports 46 and 47 is a shaft 65 which has keyed thereto a pinion 66 and the latter meshes with the gear 64. This pinion 66 has formed therewith a gear 67 and the latter meshes with a gear 68 which is loosely mounted upon a shaft 69. This gear 68 has connected thereto a casing 70 in which is arranged a coil spring which operatively connects the gear 68 with the shaft 69 and which spring stores up sufficient power for rotating the shaft 69. This shaft 69 has keyed thereto a gear 70' which meshes with a pinion 71 carried by the shaft 72, which latter is also journalled within suitable bearings arranged within the supports 46 and 47. Keyed to this shaft 72 is an escapement wheel 73 which is engaged by an escapement 74, and the latter is secured to an oscillating shaft 75. This oscillating shaft 75 is journalled within suitable bearings arranged within the supports 46 and 47 and has connected to its outer end a link or arm 76. The lower end of this arm 76 is adjustably connected, as at 77, to the pendulum lever 50, so that when the pendulum is set in motion, the escapement 74 will be operated for permitting the power stored up in the shaft 69 to revolve the shaft 72.

A suitable shaft 78 is also journalled within the supports 46 and 47 and has keyed thereto a gear 79 which meshes with the gear 67. This shaft 78 has connected thereto a sprocket wheel 80 over which passes a sprocket chain 81 and the latter passes over a sprocket wheel 82 connected to the generator 5, so that the power stored up within the clock mechanism may be used for propelling the generator, and the output of this generator is employed for operating a series of secondary clocks (not shown).

The shaft 72 is provided with a gear 83 which meshes with a gear 84 carried by a shaft 85 which is journalled within suitable bearings carried by the support 46. A gear 86 meshes with a gear 87 carried by the shaft 85, and is adapted to rotate a bevel gear 88 which meshes with a bevel gear 89 carried by the shaft 13 whereby the latter may be rotated. A shaft 90 is also employed and carries a gear 91 which meshes with the gear 87 so that this shaft 90 may also be rotated. Carried by the outer end of this shaft 90 is a large gear 92 which is adapted to mesh with a small gear 93 carried by the sleeve 94 to which the larger or minute hand is connected. A smaller gear 95 meshes with the gear 96 and the latter carries the sleeve 97 to which is connected the smaller or hour hand of the master clock. From this mechanism it is evident that the minute and hour hands of the clock may be propelled for indicating the time upon the clock dial.

Journalled within the lower ends of the supports 46 and 47 is a shaft 98 to which is connected the indicator 3. This shaft has loosely mounted thereupon a gear 99 which is in mesh with the gear 100 which meshes with the gear 67. This gear 99 carries a casing 101 in which is arranged a coil spring which connects the gear to the shaft 98 and stores up the power transmitted to the gear 99 so that this power may be employed for rotating the shaft 98 at the proper intervals. Keyed to this shaft 98 is a disk 102 and this disk has projecting from one face thereof a plurality of pins 103 which are semicircular in cross section, as shown. A depending lever 104 is provided and is connected through the horizontal bar 105 to a lever 106, and the latter is secured to the shaft 75, so that upon the oscillatory movement of this shaft 75, a swinging movement will be given the lever 104. The lower end of this lever 104 is provided with a ring 106 in which are projecting the curved arms or pins 107 and these arms 107 are adapted to travel between the pins 103, so that upon each swinging movement of the lever 104, the disk 102 will be permitted to travel the distance between these pins 103 so as to move the dial 1 for bringing the indicator 3 in contact with each circumferential contact arranged upon the face of the dial 1.

The opposite face of this disk 102 is provided with a plurality of pins 108 which pins are engaged by one end of a lever 109. This lever 109 is pivotally supported, as at 110, to the frame 46 and has connected to its opposite end a link 111. Journalled within a bearing 112 carried by the support 46 is a shaft 113 which carries a crank arm 114 and the latter being connected to the link 111. Also carried by this support 46 is a bracket 115 and pivotally supported upon this bracket 115 is a swinging escapement block or table 116. This block 116 is provided with a vertically extending arm 117 and adapted to contact with this arm 117 is a crank arm 118 carried by the shaft 113. A coil spring 119 is employed for normally holding this escapement table in the position as illustrated in Figure 10, but when the shaft 113 is oscillated so that the arm 118 may exert a force upon the extension 117, this escapement table will be rocked or moved to the position as illustrated in Figure 11. This escapement table is provided with an upper platform 120 formed of a plurality of leaf springs and a lower platform 121 which is arranged at one side of the platform 120. Loosely mounted upon the shaft 78 is a revolving escapement arm having the diametrically opposite projections 122 and 123. A coil spring 124 encircles this shaft 78 and has one end connected to this shaft, whereas the opposite end thereof is connected to the escapement arm as at 125. The power transmitted from the weight 15 through the clock gearing is partly stored up within this coil spring 124 by the rotation of the shaft 78, and when either projection of this escapement arm is released, it will permit this shaft 78 to revolve. For releasing this escapement arm, the pins 108 are provided. These pins 108, during the rotation of the disk 102 in the direction of the arrow, as shown in Figure 8, cause the lever 109 to oscillate. When this lever 109 oscillates so as to pull downwardly upon the link 111, the escapement table 116 will be moved so that one of the projections 122 or 123 will fall upon the upper platform 120. When this lever 109 has passed over the approaching pin 108, the coil spring 119 will exert a pull upon the table 116, causing the same to assume the position as shown in Figure 10, and the lever 109 will again rest between the pins 108, as is better illustrated in Figure 7. When this table 116 has been moved to the position as illustrated in Figure 10, the projection 123 of the escapement lever will fall upon the lower platform 121, again stopping the rotation of the escapement arm. As the escapement table is again moved to the position as shown in Figure 11, the projection 123 of the escapement lever will travel from the platform 121 and fall below the platform 120 where it will be released and the coil spring will exert a pull thereupon, so that the escapement arm may make a complete half revolution or until the opposite end 122 of the escapement arm strikes the platform 120.

From the foregoing description, taken in connection with the accompanying drawings, it will be manifest that a self-winding clock is provided, which will fulfill all of the necessary requirements of such a device, and it should be understood in this connection, that various minor changes in the specific details of construction can be resorted to within the scope of the appended claim, without departing from the spirit or sacrificing any of the advantages of the invention.

Having thus fully described the invention, what I claim as new and desire to protect by Letters Patent is:—

The combination with a clock mechanism having a descending weight for supplying power thereto, means for raising said weight, a switch associated with said raising means, a stem connected to said switch, a crank shaft for moving said stem whereby said switch may be opened and closed, a pulley carried by said crank shaft, a strap adapted to be wound upon said pulley and connected to said weight, said weight adapted to rotate said pulley in one direction, whereby said switch may be closed, and a coil spring for rotating said pulley in an opposite direction whereby said switch may be opened when said weight has been raised, substantially as and for the purpose specified.

ALBERTINE C. GAUCHER
NÉE ALBERTINE CERRÉ,
*Executrix of Joseph T. A. Gaucher, deceased.*